Figure 1:
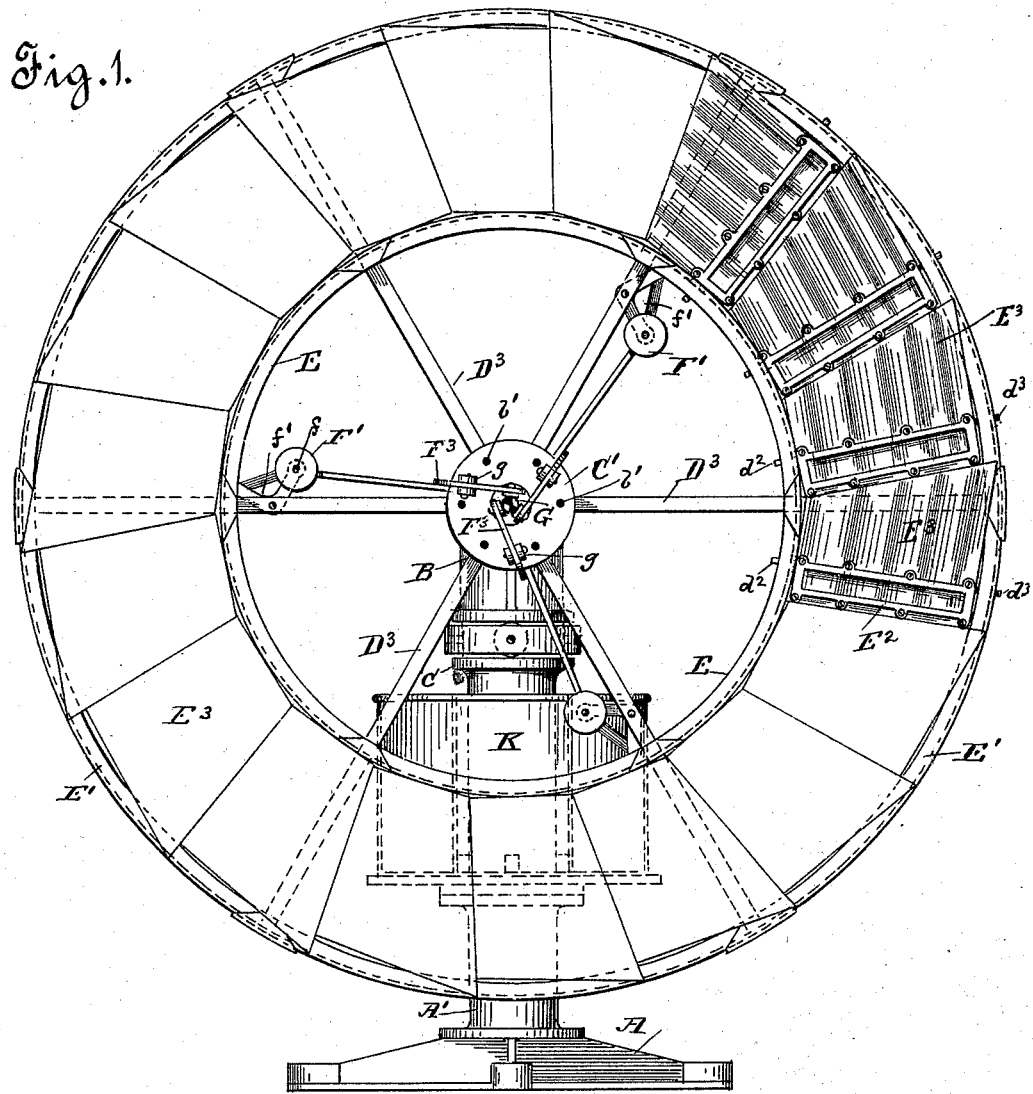

(No Model.) 2 Sheets—Sheet 1.

H. A. HYNE.
WINDMILL.

No. 591,101. Patented Oct. 5, 1897.

Witnesses.

Inventor.
H. A. Hyne
by N. O. Acker,
his atty.

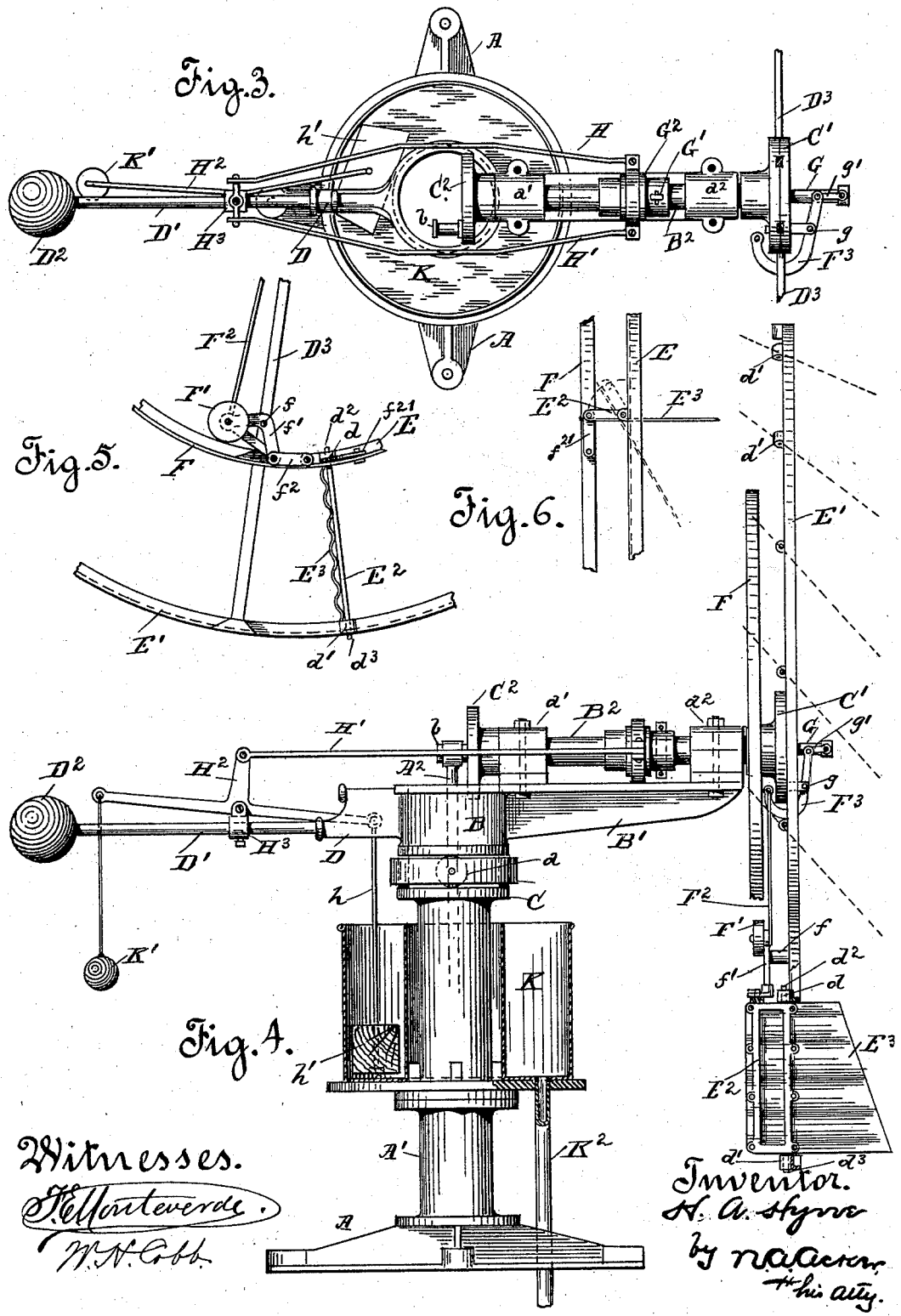

UNITED STATES PATENT OFFICE.

HENRY A. HYNE, OF SAN FRANCISCO, CALIFORNIA.

WINDMILL.

SPECIFICATION forming part of Letters Patent No. 591,101, dated October 5, 1897.

Application filed August 26, 1896. Serial No. 603,970. (No model.)

*To all whom it may concern:*

Be it know that I, HENRY A. HYNE, a subject of the Queen of Great Britain, residing at San Francisco, in the county of San Francisco and State of California, have invented certain new and useful Improvements in Windmills; and I do hereby declare that the following is a full, clear, and exact description thereof.

The present invention relates to a certain new and useful air-motor of that class commonly known as "windmills;" and it consists in the arrangement of parts and details of construction, as will be hereinafter fully set forth in the drawings and described and pointed out in the specification.

The ordinary air-motor is so constructed that the driving or motor wheel is driven edge onto the wind—that is, the wind or air strikes the vanes, blades, or paddles at their edges, so as to drive or rotate the wheel in a plane corresponding to the direction of the wind or current of air. The vanes, blades, or paddles being fixed and radiating from a common center, the speed or rotation of the motor or drive-wheel will vary with the velocity or force of the wind or air current, the working of the mill being thus irregular, sometimes rotating slowly and at other times with a high speed.

The object of my invention is to overcome this irregularity or variance in the rotation of the motor or drive wheel, which is accomplished by so securing the vanes, paddles, or blades that each will swing independently of the other in order to expose a greater or a less surface to the wind, in accordance with the velocity thereof, and constructing the motor or drive wheel so that it shall at all times stand or rotate in a vertical plane at a right angle to the wind and be driven by the wind striking full or face onto the wheel and not at its edge, as is the case in this class of machinery.

In order to fully understand this invention, reference must be had to the accompanying sheet of drawings, forming a part of the present application, wherein—

Figure 2:
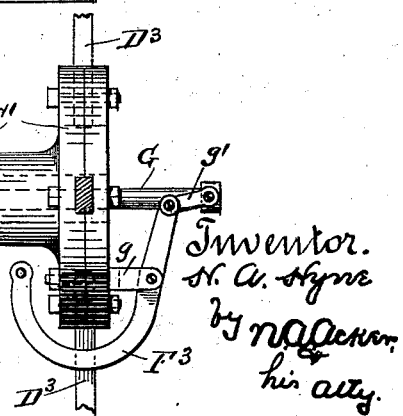

Figure 1 is a front view in elevation of the drive or motor wheel and its connecting parts, a portion of its vanes, paddles, or blades being in full, the remaining ones being merely illustrated in outlines. Fig. 2 is an enlarged detail view, partly broken away, of the drive-shaft. Fig. 3 is a top plan view of the mechanism illustrated in Fig. 1, with the motor or drive wheel, excepting its hub, removed. Fig. 4 is a side view in elevation, partly in section, of the mechanism illustrated in Fig. 1, one of the vanes, paddles, or blades being shown in full and in its position when out of the wind or edge on. Fig. 5 is a broken detail rear view showing a portion of the drive-wheel and connections; and Fig. 6 is a detail broken edge view showing the oscillatory ring, the inner rim of the wheel, one of the vanes, and the connection between the oscillatory ring and the vane.

In the drawings, the letter A is used to indicate any suitable base which is designed to be secured to the top of the frame (not shown) of the mill. From the said base upwardly extends the short hollow central column $A'$, through which works the pump or piston rod $A^2$. Upon the upper portion of the central column $A'$ is placed and works the turn-table B, which table rests and rotates on the balls $a$, interposed between the lower end of the table and the circular shoulder C, projecting from the central column A, near its upper end.

The turn-table is formed or provided with an outwardly-projecting arm $B'$, which arm supports the drive-shaft $B^2$, carrying the drive or motor wheel, said shaft working within bearing-boxes $a'$ $a^2$, secured to the upper face of the arm $B'$. To the outer end of the drive-shaft $B^2$ is keyed or otherwise secured thereon the hub $C'$ of the motor-wheel, and to the inner end is secured the circular plate $C^2$, to which the pump or piston rod $A^2$ is connected by the wrist-pin $b$.

The turn-table is provided with the tail D, to which is connected the tail-rod $D'$, carrying the counterpoise-weight $D^2$, which balances the weight of the drive or motor wheel.

To the hub $C'$ are secured, by pins or bolts $b'$, the outwardly-projecting spokes $D^3$, six in number in the present case. These spokes are secured to and support the inner and outer circular rings or rims E $E'$, which rings or rims are placed a distance apart equal to the width of the vanes, paddles, or blades.

To the under face of each ring or rim E E' is secured a series of bearings $d\ d'$, (one to each ring or rim for each vane, paddle, or blade,) within which bearings work the trunnions $d^2\ d^3$, laterally projecting from the frame $E^2$, secured to the upper face of each vane, blade, or paddle $E^3$. The vanes, blades, or paddles $E^3$ are so shaped that the forward end of each will overlap the rear end of the forward one, similarly to scales, and each vane, blade, or paddle is hung in its bearing, through the medium of the frames $E^2$, a slight distance to the rear of its center in order to compensate for the weight of the said frame $E^2$.

From the rear face of three of the spokes $D^3$ project the studs $f$, to each of which studs are secured the bell-crank levers $f'$. One arm of each bell-crank lever is connected to a ring F, located a short distance back of the inner ring or rim E, by means of the link $f^2$, Fig. 5, which links support the said ring F.

To the opposite arm of the bell-crank levers is secured the ball F', which ball acts as a governor to throw the bell-crank levers in and out with the increased or decreased rotation of the motor-wheel. The throw of this ball imparts an oscillatory or shifting rotation to the ring F, which ring being connected to the rear end of each vane, blade, or paddle by a link or toggle $F^2$ the shifting or oscillatory movement of the said ring will throw the vanes, paddles, or blades at an increased or decreased angle or inclination to the wind.

To the arm of the bell-crank levers carrying the governor-balls is secured the outer end of the connecting-rods $F^2$, the inner end of said rods being fastened to the curved end of the crank-levers $F^3$. Each lever is fulcrumed to the short studs $g$, outwardly projecting from the hub C', and the free end of each lever is connected to the outer end of the plunger-rod G by links $g'$. This plunger-rod works in and out through the hollow drive-shaft $B^2$ and is connected at its inner end to the key G', which fits through the transverse slot $g^2$, cut through the drive-shaft $B^2$ at or near its middle, which key locks the slide-collars $G^2$ upon the said shaft. To this collar is connected the outer end of the tie-rods H H', the inner end of each rod being connected to a crank-lever $H^2$, fulcrumed to a slide-collar $H^3$, working upon the tail-rod D', Fig. 4.

One arm of the crank-lever is connected by the rod, chain, or cord $h$ to a float $h'$, located within the tank K, secured around the central column A', the opposite arm of the crank-lever having the weight K' connected thereto. The weight of the float $h'$ is sufficient, unless forced or held up by water within the tank K, to overbalance the weight K'. From the tank K leads the water-pipe $K^2$, which connects with a water-reservoir. (Not shown.)

The vanes, blades, or paddles and connecting mechanism I so adjust that the vanes, blades, or paddles will stand at an angle of about forty-five degrees under a wind-pressure having a velocity of, say, about twelve miles per hour.

Should the velocity of the wind increase, however, the pressure of the wind will throw the vanes, blades, or paddles at such an angle that less surface will be exposed, so that the rotary travel of the wheel will be the same as though the wind's velocity was only twelve miles per hour. The vanes, blades, or paddles by automatically shifting their angle in accordance with the velocity of the wind expose only such a surface of resistance as will suffice to maintain the wheel working at a uniform speed. As the vanes, paddles, or blades shift in or out the ring F is oscillated or rotated forward and backward.

The water from the pump is forced into the ordinary water-reservoir (not shown) provided with the usual safety or overflow valve. When the reservoir is pumped full, the overflow passes through the safety-valve and escapes into the tank K through the connecting-pipe $K^2$. As the water enters this tank the float $h'$ is gradually raised and the outer end of the crank-lever $H^2$ lowered by the weight K'. The downward movement of the weight K' forces the fulcrumed crank-lever away from the wheel, which lever draws therewith, through the medium of the tie-rods, the collar $G^2$. This collar as moved toward the plate $C^2$ or inner end of the drive-shaft draws the plunger-rod inward or within the shaft $B^2$. The outer end of the plunger-rod being connected to the fulcrumed curved levers $F^3$, it is obvious that as the rod moves inward the curved end of the levers will be forced outward. This end of the levers being connected to the arm of the bell-crank levers $f$, carrying the governor-balls through the medium of the rods $F^2$, the movement of the curved levers will throw said arm of the bell-crank levers outward and the opposite end inward. As the arm of the said levers $f'$ is thrown inward the ring F, connected therewith by links $f^2$, will be oscillated or rotated in a direction the reverse of the rotation of the motor-wheel. This movement of the ring F, through its connection with the vanes, blades, or paddles, will shift the blades, paddles, or vanes until they stand edge to the wind, Fig. 4. In this position no surface of the blades, paddles, or vanes being exposed to the action of the wind the wheel will cease its rotation. As the water is drawn from the tank K the movement of the parts is the reverse of the movement just described.

Inasmuch as the wheel in the present mill stands at a right angle to the wind and is driven by the wind striking against the rear face thereof I am enabled to make use of a much larger wheel than where the wheel is driven by the wind striking against the edge or periphery thereof, for the reason that where the wheel is driven by the wind striking against the edge there is danger, unless an exceedingly strong frame be provided, of the mill toppling or falling over if a large wheel is used.

In the present machine the vanes, blades, or paddles not only adjust themselves automatically to the varying velocity of the wind in order to impart a uniform speed to the wheel, but are automatically thrown out of the wind when the water-reservoir has become filled.

Having thus described my invention, what I claim as new, and desire to secure protection in by Letters Patent, is—

In a windmill, the combination of a supporting-frame, a turn-table thereon, a drive-shaft mounted in bearings on the turn-table, a hub on said shaft, inner and outer rims secured to spokes projecting from said hub, a series of vanes, blades or paddles hinged to said rims, an oscillating solid ring connected by a link to each of said vanes, blades or paddles, a plurality of bell-crank levers fulcrumed on said spokes, a connection from one arm of each bell-crank lever to the oscillating ring, a weight on the other arm of each bell-crank lever, a bent lever fulcrumed on said hub for each bell-crank lever, a link connecting the bent lever to each weighted arm of a bell-crank lever, a sliding plunger-rod working in said drive-shaft, links connecting the bent levers with said plunger-rod, a weighted lever supported by said turn-table, and a connection between said angle-lever and said plunger-rod, substantially as described.

In testimony whereof I affix my signature, in presence of two witnesses, this 17th day of August, 1896.

HENRY A. HYNE.

Witnesses:
LEE D. CRAIG,
N. A. ACKER.